United States Patent
Lyman et al.

(10) Patent No.: US 11,321,765 B2
(45) Date of Patent: May 3, 2022

(54) METHOD, APPARATUS, AND MEDIUM FOR PRODUCT ORDERING USING A HOME AUTOMATION SYSTEM

(71) Applicant: Vivint, Inc., Provo, UT (US)

(72) Inventors: Jefferson H. Lyman, Alpine, UT (US); Matthew J. Eyring, Provo, UT (US)

(73) Assignee: VIVINT, INC., Provo, UT (US)

( * ) Notice: Subject to any disclaimer, the term of this patent is extended or adjusted under 35 U.S.C. 154(b) by 639 days.

(21) Appl. No.: 15/178,926

(22) Filed: Jun. 10, 2016

(65) Prior Publication Data

US 2016/0364789 A1    Dec. 15, 2016

Related U.S. Application Data

(60) Provisional application No. 62/174,360, filed on Jun. 11, 2015.

(51) Int. Cl.
*G06Q 30/06*    (2012.01)
*G06Q 10/08*    (2012.01)

(52) U.S. Cl.
CPC ....... *G06Q 30/0635* (2013.01); *G06Q 10/083* (2013.01)

(58) Field of Classification Search
CPC ............. G06Q 30/0635; G06Q 10/083; G06Q 30/0601–0645
USPC ..................................... 705/26.81, 26.1–27.2
See application file for complete search history.

(56) References Cited

U.S. PATENT DOCUMENTS

| | | | | |
|---|---|---|---|---|
| 9,626,814 | B2 * | 4/2017 | Eyring | G07C 9/00896 |
| 2002/0120627 | A1 * | 8/2002 | Mankoff | G06Q 30/02 |
| 2005/0234641 | A1 * | 10/2005 | Marks | G06Q 10/08 |
| | | | | 701/484 |
| 2007/0015494 | A1 * | 1/2007 | Sinclair | H04M 1/72457 |
| | | | | 455/414.1 |
| 2012/0150677 | A1 * | 6/2012 | Shuster | G06Q 30/0601 |
| | | | | 705/26.1 |
| 2012/0194043 | A1 * | 8/2012 | Turner | G07F 7/00 |
| | | | | 312/109 |
| 2012/0253971 | A1 * | 10/2012 | Bansal | G06Q 30/0635 |
| | | | | 705/26.8 |
| 2015/0145643 | A1 * | 5/2015 | Fadell | G06Q 10/083 |
| | | | | 340/5.51 |
| 2015/0278912 | A1 * | 10/2015 | Melcher | G06Q 30/0631 |
| | | | | 705/26.7 |

OTHER PUBLICATIONS

Vivint Helps Consumers Prevent Intrusion This Summer with Home Automation, May 30, 2013, PR Newswire (Year: 2013).*

* cited by examiner

*Primary Examiner* — Marissa Thein
*Assistant Examiner* — Anna Mae Mitros
(74) *Attorney, Agent, or Firm* — Kunzler Bean & Adamson, PC

(57) ABSTRACT

Methods for product ordering relating to an automation system are described. Exemplary methods may include receiving one or more inputs, identifying one or more product order-related parameters, receiving information related to a product order, determining delivery data based at least in part on the information, and initiating an automation system operation based at least in part on the delivery data.

18 Claims, 9 Drawing Sheets

METHOD, APPARATUS, AND MEDIUM FOR PRODUCT ORDERING USING A HOME AUTOMATION SYSTEM

RELATED APPLICATIONS

The present Application claims priority to U.S. Provisional Patent Application No. 62/174,360, entitled "Techniques for Product Ordering Using a Home Automation System", filed on Jun. 11, 2015, the disclosure of which is incorporated by reference herein in its entirety.

BACKGROUND

The present disclosure, for example, relates to security and/or automation systems, and more particularly to ordering and/or reordering methods and systems relating to consumer and/or other products.

Security and automation systems are widely deployed to provide various types of communication and functional features such as monitoring, communication, notification, and/or others. These systems may be capable of supporting communication with a user through a communication connection or a system management action.

The constant management and stocking of supplies in a home or a business can be a difficult task requiring consistent attention. The task may require several trips to various stores to purchase needed supplies at different times. Consumers may forget one or more items or, if a product is gone before the consumer is able to buy more, the consumer may have to live without a product for a period of time.

SUMMARY

As technology in the home continues to develop, home automation systems have been created to perform tasks users would otherwise need to perform. One such development relies on an automation system that can facilitate product ordering and/or detect when a product needs to be reordered using one or more automation system components. Using many of the following methods, an automation system would be able to facilitate, order, and/or track a product required by a user, a group of users, and/or a structure. An automation system can also perform operations relating to the product delivery including initiating operations of the structure and/or an automation system component.

The present systems and methods include, among other things, methods and apparatuses related to receiving various inputs, such as from a user via a control panel or an electronic device, and/or via one or more sensors. In order to provide reliable operation, the system may be configured to identify product information. The system would then process the identified information in order to place and/or facilitate an order requesting the product to be delivered to the structure.

Methods for product ordering relating to an automation system are disclosed. In some embodiments, the methods may include receiving one or more inputs, identifying one or more product order-related parameters, receiving information related to a product order, determining delivery data based at least in part on the information, and/or initiating an automation system operation based at least in part on the delivery data.

In some embodiments, the methods may further include initiating a notification to a user. In some embodiments, the notification may include at least one of a date, a day of a week, a time, a location, a product type, an estimated delivery date, and/or a combination thereof. In some embodiments, the notification may include a reminder. In some embodiments, the notification may include a confirmation.

In some embodiments, the one or more inputs may include user input. In some embodiments, the one or more inputs may include audible input. In some embodiments, the one or more inputs may include one or more time periods. In some embodiments, the one or more inputs may include image data. In some embodiments, the one or more inputs may include past order data.

In some embodiments, the one or more product order-related parameters may include one or more user preferences. In some embodiments, the one or more product order-related parameters may include a default product provider. In some embodiments, the one or more product order-related parameters may include default shipping information. In some embodiments, the delivery data may be based at least in part one at least one of a date, a time, a deliverer, weather information, occupancy information, product information, and/or a combination thereof.

In some embodiments, the automation system operation may include actuating a lock. In some embodiments, the automation system operation may include capturing image data. In some embodiments, the automation system operation may include changing a position of a door. In some embodiments, the automation system operation may include actuating a sensor.

Apparatuses for security and/or automation systems are disclosed. In some embodiments, the apparatus may include a processor, memory in electronic communication with the processor, and/or instructions stored in the memory. In some embodiments, the instructions may be executable by the processor to receive one or more inputs, identify one or more product order-related parameters, receive information related to a product order, determine delivery data based at least in part on the information, and/or initiate an automation system operation based at least in part on the delivery data. In some embodiments, the instructions may include initiating a notification to a user.

Non-transitory computer readable mediums storing computer-executable code are disclosed. In some embodiments, the code may be executable by a processor to receive one or more inputs, identify one or more product order-related parameters, receive information related to a product order, determine delivery data based at least in part on the information, and initiate an automation system operation based at least in part on the delivery data. In some embodiments, the computer-executable code may include initiating a notification to a user.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

One of the major roles of technology has been to perform tasks that people would otherwise need to perform. Through the use of technology not only are tasks performed more efficiently, but the burden on the user can be eliminated or greatly diminished. Product ordering provides one example of a constant, burdensome task, that is often easy to forget.

The proposed systems and methods relate, in some embodiments, to a home automation system capable of searching, detecting, and/or ordering (or facilitating ordering) products for a consumer. The various systems, apparatuses, and/or methods may use sensors, cameras, scales, timers, and/or user input to recognize and/or predict when an item is needed to be replaced. The various systems, apparatuses, and/or methods may create an order and/or receive a confirmation from the user before sending the order/request to a provider. Additionally or alternatively, the various systems, apparatuses, and/or methods may automatically order and/or reorder one or more products. During shipping, the various systems, apparatuses, and/or methods may track the order and provide the consumer with information regarding the estimated time and date of arrival. Additionally or alternatively, the various systems, apparatuses, and/or methods may initiate an operation of an automation system component (e.g., a lock, a front door, a garage door, etc.) based on information, such as the delivery information and/or data, of the order/request.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
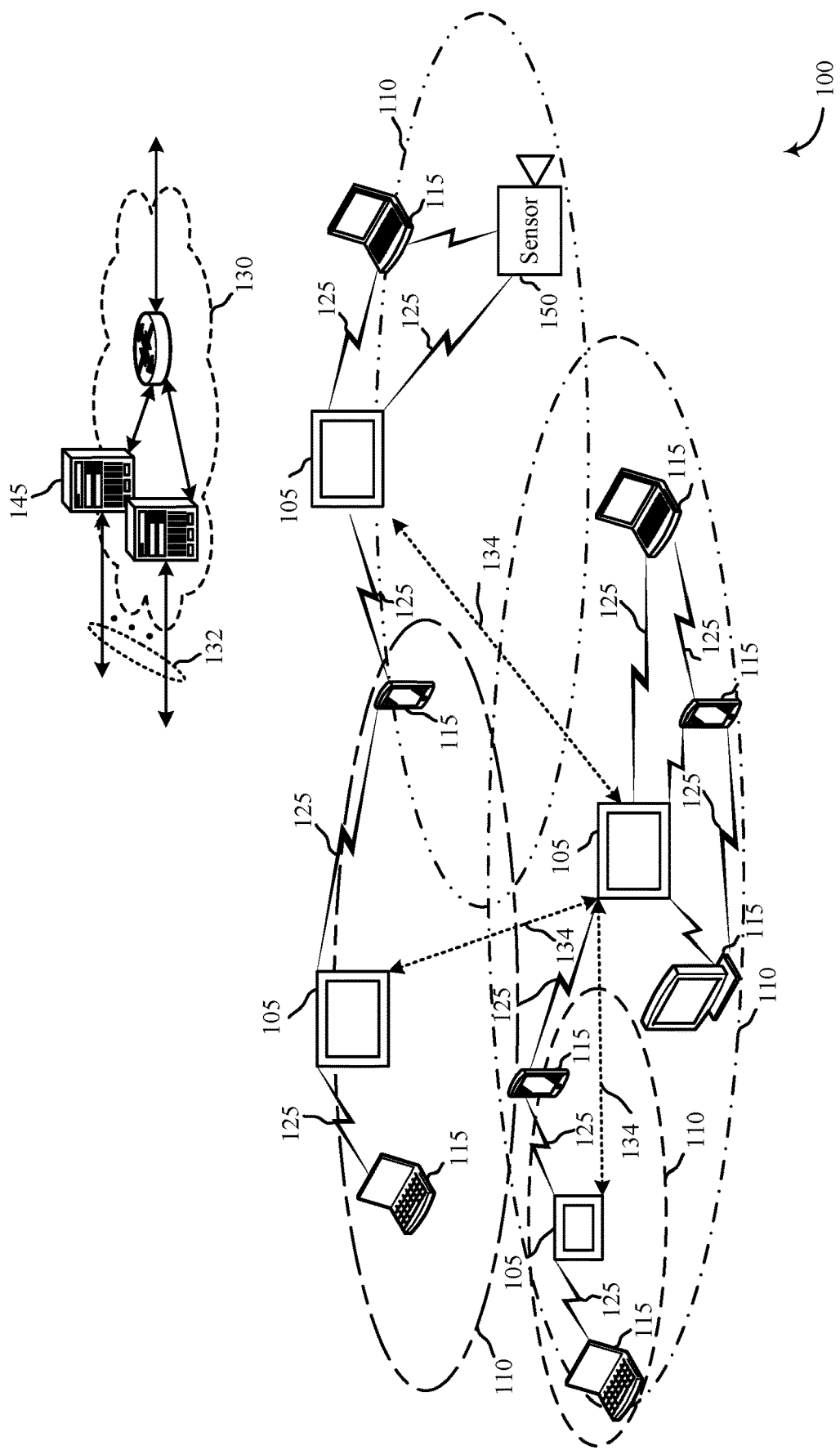
FIG. 1 shows a block diagram relating to a security and/or an automation system, in accordance with various aspects of this disclosure.

FIG. 1 illustrates an example of a communications system 100 in accordance with various aspects of the disclosure. The communications system 100 may include apparatuses 105, devices 115, a network 130, and/or sensors 150. The network 130 may provide user authentication, encryption, access authorization, tracking, Internet Protocol (IP) connectivity, and other access, calculation, modification, and/or functions. The apparatuses 105 may interface with the network 130 through a first set of wired and/or wireless communication links 132 to communicate with one or more remote servers 145. The apparatuses 105 may perform communication configuration, adjustment, and/or scheduling for communication with the devices 115, or may operate under the control of a controller. In various examples, the apparatuses 105 may communicate—either directly or indirectly (e.g., through network 130)—with each other over a second set of wired and/or wireless communication links 134.

Apparatuses 105 may communicate with a back end server (such as the remote servers 145)—directly and/or indirectly—using the first set of one or more wired and/or wireless communication links 132.

The apparatuses 105 may wirelessly communicate with the devices 115 via one or more antennas. Each of the apparatuses 105 may provide communication coverage for a respective geographic coverage area 110. In some examples, apparatuses 105 may be referred to as a control device, a control panel, a base transceiver station, a radio base station, an access point, a radio transceiver, or some other suitable terminology. The geographic coverage area 110 for an apparatus 105 may be divided into sectors making up only a portion of the coverage area. The communications system 100 may include apparatuses 105 of different types. There may be overlapping geographic coverage areas 110 for one or more different parameters, including different technologies, features, subscriber preferences, hardware, software, technology, and/or methods. For example, each apparatus 105 may be related to one or more discrete structures (e.g., a home, a business) and each of the one more discrete structures may be related to one or more discrete areas. In other examples, multiple apparatuses 105 may be related to the same one or more discrete structures (e.g., multiple apparatuses relating to a home and/or a business complex).

The devices 115 may be dispersed throughout the communications system 100 and each device 115 may be stationary and/or mobile. A device 115 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a camera, a key fob, and/or the like. A device 115 may also include or be referred to by those skilled in the art as a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology.

The apparatuses 105 may wirelessly communicate with the sensors 150 via one or more antennas. The sensors 150 may be dispersed throughout the communications system 100 and each sensor 150 may be stationary and/or mobile. A sensor 150 may include and/or be one or more sensors that sense: proximity, motion, temperatures, humidity, sound level, smoke, structural features (e.g., glass breaking, window position, door position), time, light geo-location data of a user and/or a device, distance, biometrics, weight, speed, height, size, shape, color, indicia, branding, label, bar codes, preferences, light, darkness, weather, time, system performance, and/or other inputs that relate to a security and/or an automation system. A device 115 and/or a sensor 150 may be able to communicate through one or more wired and/or wireless connections with various components such as apparatuses, base stations, and/or network equipment (e.g., servers, wireless communication points, etc.) and/or the like.

The communication links 125 shown in communications system 100 may include uplink (UL) transmissions from a device 115 to an apparatus 105, and/or downlink (DL) transmissions, from an apparatus 105 to a device 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 125 may transmit bidirectional communications and/or unidirectional communications. Communication links 125 may include one or more connections, including but not limited to, 345 MHz, Wi-Fi, BLUETOOTH®, BLUETOOTH® Low Energy, cellular, Z-WAVE®, 802.11, peer-to-peer, LAN, WLAN, Ethernet, fire wire, fiber optic, and/or other connection types related to security and/or automation systems.

In some embodiments, one or more components of communications system 100 may relate to and/or facilitate product reordering systems, apparatuses, and/or methods. In some embodiments, one or more sensors 150 and/or devices 115 may receive one or more inputs from one or more sources (e.g., a user, a structure, a product, an electronic database, another communications system, one or more other components of communications system 100, and/or some combination, among others). These inputs may directly and/or indirectly relate to and/or facilitate product ordering and/or reordering. In some embodiments, these inputs may include, but are not limited to, information relating to product usage, a product's status (e.g., full, partially used, mostly used, completely used, etc.), information relating to one or more users' usage pattern(s), information relating to past and/or projected product orders (e.g., including those relating to inputs and/or other information captures and/or otherwise gathered by one or more components of communications system 100), some combination, and/or other information.

In some embodiments, one or more communications system 100 components (e.g., apparatus 105, device 115) may receive one or more inputs from one or more other components of communications system 100 (including components within a different geographic coverage area 110, within the same geographic coverage area 110, of the same type, of a different type, some combination, and/or other components). Based at least in part on these inputs and/or other information and/or data, one or more components may perform one or more operations and/or functions relating to product ordering. In some embodiments, these operations and/or functions may include identifying one or more product order-related parameters (which may or may not be based at least in part on the received inputs). In some embodiments, these operations and/or functions may include receiving information related to a product order (which may include, but are not limited to, generating a new product order and/or referencing a past product order, relating to one or more operations and/or functions performed by apparatus 105, device 115, sensor 150, remote server 145, and/or another component of communications system 100, some combination, and/or other alternatives).

In some embodiments, these operations and/or functions may include determining delivery data based at least in part on the information (which may include referencing a current product order, referencing occupancy data and/or information, referencing a past product order, operations and/or functions performed by a communications system 100 component, some combination, and/or other things). In some embodiments, these operations and/or functions may include generating a notification (to a user and/or a component of communications system 100, among other things) relating to a product order and may include actual delivery information, cost, shipping entity, supplying entity, projected delivery information, past order information, image inputs, audible inputs, user inputs, some combination, and/or other alternatives.

In some embodiments, these operations and/or functions may include initiating an automation system operation (via apparatus 105, device 115, sensor 150, remote server 145, another communications system 100 component, some combination, and/or other device) based at least in part on the determining and/or the delivery data among other things. In some embodiments, based at least in part on delivery information relating to a product order, among other things, one or more components of communications system 100 may perform an operation relating to an automation system component, including, but not limited to, opening a door, activating an image device, actuating a lock, recording one or more types of data, tracking movement and/or location, correlating environmental and/or occupancy data and/or information, some combination, and/or other operations.

In some embodiments, of communications system 100, apparatuses 105 and/or devices 115 may include one or more antennas for employing antenna diversity schemes to improve communication quality and reliability between apparatuses 105 and devices 115. Additionally or alternatively, apparatuses 105 and/or devices 115 may employ multiple-input, multiple-output (MIMO) techniques that may take advantage of multi-path, mesh-type environments to transmit multiple spatial layers carrying the same or different coded data.

While the devices 115 may communicate with each other through the apparatus 105 using communication links 125, each device 115 may also communicate directly with one or more other devices via one or more direct communication links 134. Two or more devices 115 may communicate via a direct communication link 134 when both devices 115 are in the geographic coverage area 110 or when one or neither devices 115 is within the geographic coverage area 110. Examples of direct communication links 134 may include Wi-Fi Direct, BLUETOOTH®, wired, and/or, and other P2P group connections. The devices 115 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within communications system 100.

Figure 2:
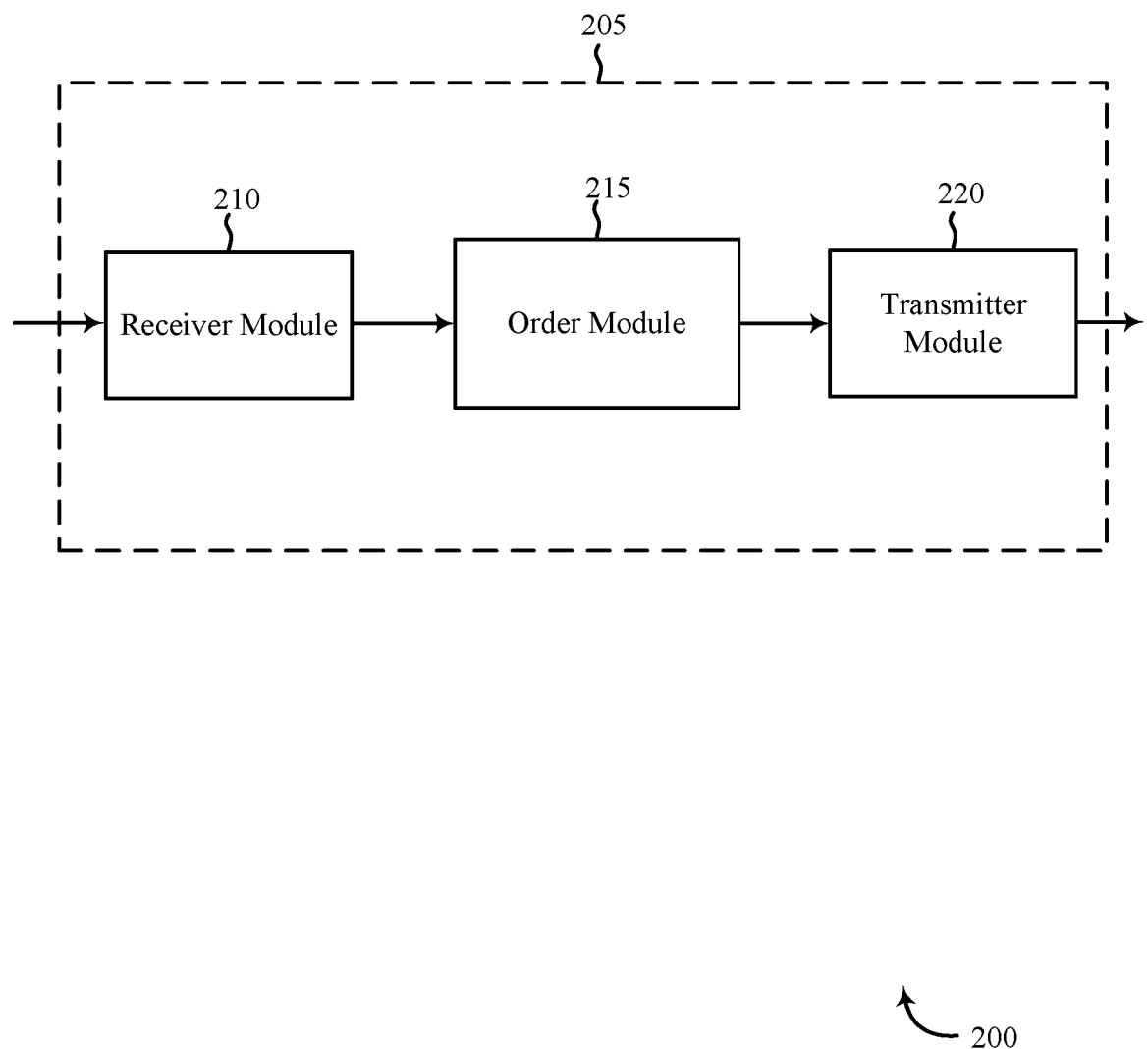
FIG. 2 shows a block diagram of an apparatus relating to a security and/or an automation product ordering system, in accordance with various aspects of this disclosure.

FIG. 2 shows a block diagram 200 of an apparatus 205 for use in electronic communication, in accordance with various aspects of this disclosure. The apparatus 205 may be an example of one or more aspects of an apparatus 105 described with reference to FIG. 1, among others. The apparatus 205 may include a receiver module 210, an order module 215, and/or a transmitter module 220. The apparatus 205 may also be or include a processor. Each of these modules may be in communication with each other—directly and/or indirectly.

The components of the apparatus 205 may, individually or collectively, be implemented using one or more application-specific integrated circuits (ASICs) adapted to perform some or all of the applicable functions in hardware. Additionally or alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to and/or capable of receiving information through wired and/or wireless connections from and/or relating to one or more components of communications system 100, including but not limited to apparatuses 105, devices 115, remote servers 145, sensors 150, and/or information from apparatus 205 (including from another module such as order module 215), among others. Information may be passed on to the order module 215, the transmitter module 220, and/or to other components and/or elements of the apparatus 205 and/or a system, such as communications system 100, among others.

The order module 215 may perform one or more operations relating to an apparatus, a device, and/or a remote server (including, but not limited to, apparatus 205, device 115, remoter server 145), that may be configured to, relate to, and/or capable of performing one or more functions and/or operations relating to one or more product orders and/or product ordering operations. The operations, features, and methods relating to order module 215 may be performed regardless of whether the system includes every component and/or element disclosed. References to an apparatus 205 and/or an order module 215 (and variations) include all functions, features, and capabilities disclosed with respect to other apparatuses, remote servers, and devices, unless otherwise specifically noted.

The transmitter module 220 may transmit the one or more signals received from other components of the apparatus 205 and/or other components of any system, such as communications system 100. The transmitter module 220 may transmit information and/or data relating to one or more inputs, parameters, order information, delivery data, initiating operations, and/or other information and/or data, among other things. In some embodiments, the transmitter module 220 may be collocated with the receiver module 210 in a transceiver module. In other embodiments, the transmitter module 220 may not be collocated with the receiver module 210 in a transceiver module.

In some embodiments, the receiver module 210 and the transmitter module 220 may communicate at least some information and/or data directly between each other.

Figure 3:
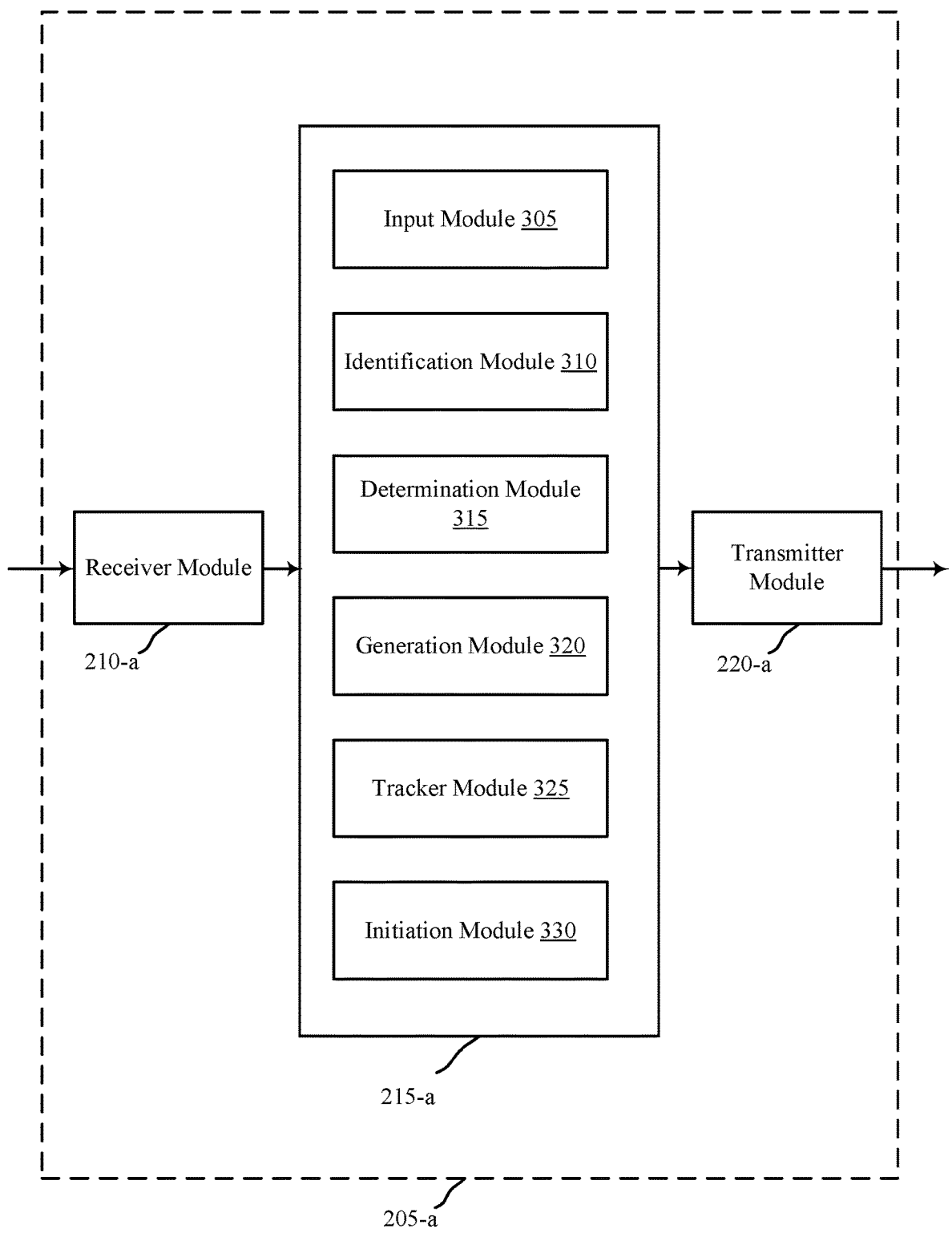
FIG. 3 shows a block diagram of an apparatus relating to a security and/or an automation product ordering system, in accordance with various aspects of this disclosure.

FIG. 3 shows a block diagram 300 of an apparatus 205-a for use in product ordering operations, in accordance with various examples. The apparatus 205-a may be an example of one or more aspects of an apparatus 105 described with reference to FIG. 1, among others. It may also be an example of an apparatus 205 described with reference to FIG. 2, among others. The apparatus 205-a may include a receiver module 210-a, an order module 215-a, and/or a transmitter module 220-a, which may be examples of the corresponding modules of apparatus 205. The apparatus 205-a may also include a processor. Each of these components may be in communication with each other, directly and/or indirectly. The order module 215-a may include input module 305, identification module 310, determination module 315, generation module 320, tracker module 325, and/or initiation module 335, among others. The receiver module 210-a and the transmitter module 220-a may perform the functions of the receiver module 210 and the transmitter module 220, of FIG. 2, respectively, or may, in some embodiments, perform additional and/or alternative functions.

The components of the apparatus 205-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

In some embodiments, apparatus 205-a may include one or more modules to perform one or more operations and/or functions. In some embodiments, apparatus 205-a may include an input module 305. Input module 305 may perform one or more operations and/or functions relating to one or more inputs. In some embodiments, input module 305 may receive one or more various inputs such as data and/or information. Examples of one or more inputs may include, but are not limited to, user input, user characteristic input, audio input, image input, video input, picture input, text input, voice input, word input, instruction input, weight input, time input, numerical input, bar code input, some combination, and/or other inputs. In some embodiments, input module 305 may perform one or more operations on one or more sets of input information and/or data. These operations may include, but are not limited to, receiving, analyzing, ordering, grouping, organizing, assembling, comparing, determining one or more characteristics, identifying input type or other information, related to one or more inputs. One or more operations may be performed using a pre-programmed algorithm, a dynamic algorithm based on updated and/or addition information such as inputs (among other things), and/or some combination of these algorithms, among others.

In some embodiments, at least some of the various inputs may be captured and/or received by one or more devices (e.g., sensors 150, apparatuses 205, etc.) based on one or more characteristics, including but not limited to, motion, voice command, time, proximity, user request, user verification, prompt by an automation system, based on one or more specific actions relating to one or more automation system components, some combination, and/or others. In some embodiments, one or more operations relating to inputs may be performed automatically based at least in part on one or more criteria, one or more users' preferences, pre-determined system preferences, a user profile setting, a default, a passage of time, one or more sensor inputs, a user action relating to an electronic device, a user action at a control panel, some combination, and/or others.

In some embodiments, input module 305 may receive input data from a local memory storage unit that is part of or separate from a home automation system. In some embodiments, input module 305 may receive input stored locally, stored on a remote server, and/or stored based on a local area network that facilitates communication and memory storage sharing between similarly-located home automation systems. For example, input module 305 may receive one or more types of data from a memory storage device positioned within a structure, like a home. These types of data may include, but are not limited to, user preferences, user profiles, information relating to significant events, security features, image data (e.g., photos, videos), combinations of these, and/or other information. The input module 305 may receive this data directly and/or indirectly from the memory storage device and, based at least in part on this data, perform one or more operations and/or functions relating to product ordering. For example, input module 305 may receive image data of a significant event that was captured on a certain day (e.g., a birthday, an anniversary). In some embodiments, the system may, via an algorithm, analyze the image data, extract relevant identifying characteristics and/or product (among other things), prompt the user to order one or more products relating to the significant event (or alternatively automatically order a product based at least in part on one or more setting) and/or one or more user's relating to the significant event (e.g., pictured in the image data), among other things, and/or initiate further order operations based on the image and/or other data stored on the memory device.

In some embodiments, apparatus 205-a may include an identification module 310. In some embodiments, identification module 310 may perform one or more operations and/or functions relating to one or more inputs, products, product orders, parameters, characteristics, some combination, and/or other information and/or data. In some embodiments, identification module 310 may utilize one or more algorithms to perform one or more operations and/or functions relating to one or more different types of data, including, but not limited to order-related parameters. In some embodiments, examples of such parameters may include one or more types, of past, present, and/or future order information, such as pricing, data, dates, products, brands, quantity, frequency, supplying entities (e.g., Wal-Mart, Target, online retailers), shipping preferences, shipping practices, shipping costs, shipping time, current supply, projected time of need, importance of a product (e.g., a necessity product vs. a comfort product), product availability, some combination, and/or other information and/or data. In some embodiments, one or more default parameters or characteristics may be identified based at least in part on user choice, user preferences, system operations, system determinations relating to price and/or other information, projected shipping arrival, proximity to a structure and/or a user, shipping time, product origin (e.g., a certain state and/or region).

In some embodiments, order module 215-a may include a determination module 315. Determination module 315 may perform one or more operations and/or functions relating to one or more inputs, identification, product parameters, product orders, notifications, operations, initiations, and/or other actions, among others. Determination module 315 may determine data and/or other information relating to one or more product orders, including, but not limited to, past and/or current product orders. For example, in some embodiments, determination module 315 may perform one or more operations relating to delivery data.

These operations may include, but are not limited to, receiving, analyzing, ordering, grouping, determining one or more characteristics, identifying input type or other information, related to one or more inputs, some combination, and/or other operations. One or more operations may be performed using a pre-programmed algorithm, a dynamic algorithm based on updated and/or addition information such as inputs, and/or some combination of these algorithms, among others. For example, determination module 315 may determine a projected delivery date, time, carrier, package size, weight, relation to other deliveries at and/or near the same structure, relation to past occupancy data, relation to projected occupancy data correlated with one or more pieces of delivery information, some combination, and/or other information.

In some embodiments, order module 215-a may include a generation module 320. Generation module 320 may perform one or more operations and/or functions relating to one or more inputs, parameters, orders, notifications, some combination, and/or other information and/or data. In some embodiments, generation module may perform one or more steps of an algorithm. In some embodiments, the one or more steps may be based at least in part on information received from and/or actions performed by one or more other modules, including modules 305-315 and 325-330, among others.

In some embodiments, generation module 320 may generate a new product order based at least in part on one or more inputs relating to input module 305, based at least in part on one or more identifications performed by identification module 310, based at least in part on one or more determinations performed by determination module 315, and/or other operations performed by other modules. In some embodiments, a new product order may be based at least in part on other actions performed by other modules, other actions performed by generation module 320, constraints related to shipping, products, user location, user preferences, etc., past orders information and/or data, user actions relating to one or more past orders of the same and/or a different products, some combination, and/or other information and/or data.

In some embodiments, generation module 320 may generate a notification. In some embodiments, this notification may be related to actions and/or functions relating to one or more other modules, including but not limited to tracker module 325, initiation module 330, determination module 315, some combination, and/or others. In some embodiments, generation module 320 may generate a notification that is communicated to a user via text on a device, a control panel, projected on a structure surface, a smartphone, a wearable device, via glasses, via audio notification in a structure, a car, a voicemail, a certain tone, a certain sound pattern, via a tactile reminder, including a specific pattern, some combination of these, and/or other things.

In some embodiments, generation module 320 may generate a notification that may include at least one of a date, a day of a week, a time, a location, a product type, an estimated delivery date, some combination, and/or other information and/or data. In some embodiments, generation module 320 may generate a reminder, that may relate to one or more of an input, an identification, a determination, an order related parameter, a characteristic, tracking information and/or data, operation initiations, a request for user input, a default action and/or function, a time period, some combination, and/or other information. In some embodiments, generation module 320 may generate a confirmation, that may relate to one or more of an input, an identification, a determination, an order related parameter, a characteristic, tracking information and/or data, operation initiations, a request for user input, a default action and/or function, a time period, some combination, and/or other information.

In some embodiments, order module 215-*a* may include a tracker module 325. Tracker module 325 may perform one or more operations and/or functions relating to one or more inputs, identification, product parameters, product orders, notifications, operations, initiations, user locations, and/or other actions, among others. Tracker module 325 may track, analyze, calculate, determine data and/or other information relating to one or more product orders, including, but not limited to, past and/or current product orders. For example, in some embodiments, tracker module 325 may perform one or more operations relating to delivery data, including tracking the location and projected delivery date of one or more products, the location of one or more users at a certain time, past location data relating to one or more users, relative location of a user to one or more locations such as a specific structure, some combination, and/or other information and/or data.

These operations may include, but are not limited to, receiving, analyzing, calculating, correlating, comparing, associating, linking, determining one or more characteristics, parameters, data, locations, some combination, and/or other information and/or data. One or more operations may be performed using a pre-programmed algorithm, a dynamic algorithm based on updated and/or addition information such as inputs, and/or some combination of these algorithms, among others. For example, tracker module 325 may track a product order delivery and/or a user location, including projected delivery date, time, carrier, package size, weight, relation to other deliveries at and/or near the same structure, relation to past occupancy data, relation to projected occupancy data correlated with one or more pieces of delivery information, GPS location data, facial recognition data at one or more locations, user location based on a device location, some combination, and/or other information.

In some embodiments, order module 215-*a* may include an initiation module 330. Initiation module 330 may perform one or more operations and/or functions relating to one or more inputs, identifications, product parameters, product orders, notifications, operations, tracking function, user locations, some combination, and/or other actions. Initiation module 330 may initiate one or more operations relating to input collecting, input analysis, other operations relating input, identification operations, determination operations, generation operations, tracking operations, and/or other functions. For example, in some embodiments, initiation module 330 may perform one or more operations relating to an automation system, including initiating an automation component and/or system operation. In some embodiments, these automation components and/or system operations may include, but are not limited to, initiating an activation, a deactivation, an analysis, an actuating, a status change, capturing data and/or information, recording, changing, modifying, adjusting, an operation relating to one or more inputs, some combination, and/or other operations. In some embodiments, these operations may relate to and/or be performed on one or more automation components, a door, a window, a sensor, a barrier, a lock, an alarm, a camera, a doorbell unit, a powered faceplate, a sensor, a smartphone, a control panel, a remote server, a remote memory storage, some combination, and/or other things In some embodiments, the initiation may be based at least in part on product order-related information. In some embodiments, the initiation may be based at least in part on delivery-related information, including but not limited to date, day of the week, time, size of the package, delivery company, occupancy of a structure, actual user location, projected user location, weather, environmental parameters, some combination, and/or other information and/or data.

In some embodiments, modules 305-330 may be located within one device such as a user's electronic device, a control panel, and/or a remote server, among others. In other embodiments, some of modules 305-330 may be located within a first device (e.g., a control panel) while other of modules 305-330 may be located within a second device (e.g., a smartphone, a remote server).

In some embodiments, input module 305 may receive audio data. In some embodiments, input module 305 may act as, use, and/or be a microphone and/or another sound-related device. For example, a user wanting to order a product or learn information about a past product order may speak into a speaker, either located in a room, in a specific area of a room, at a control panel, via an electronic device, some combination, and/or other methods. In some embodiments, the user may provide user input, such as a voice command, to order a product. Information and/or data relating to the user input and/or product order may then be transmitted to one or more devices, such as the apparatus, to have one or more functions and/or algorithms performed. Once the input, information, and/or data has been processed by the apparatus and/or some other device that may include the use of the automated system, one or more components can confirm that the processed order is correct and/or accurate based at least in part on a communication with the user and/or a comparison with product order information, among other things. This confirmation may be performed via one or more notifications, messages, alerts, etc.

In some embodiments, the input module 305 may include various functions, including those associated with a mobile device and/or a control panel. For example, a user wanting to order a product may initiate an order by selecting a product using a mobile device via manually selecting the product, via voice command, capturing image data relating to a product, some combination, and/or other information and/or date. In some embodiments, the mobile device and/or the control panel will transmit the order to another apparatus to perform one or more functions (including order finalizing, processing, shipping, etc.) and/or will perform one or more functions at the component(s) themselves.

In some embodiments, the input module 305 may act as, use, and/or be a designated electronic button or electronic application. For example, a user may have need of frequently ordering a specific product (e.g., laundry detergent, candy, movies, clothing, diapers, food products, toiletries, etc.), a designated electronic button, electronic application, and/or electronic symbol can be positioned on a commonly used electronic device such as a control panel, a wearable device, and/or a smartphone. In some embodiments, the designated electronic button could be placed in an area where the product is frequently used (e.g., near a kitchen, near a bathroom, near a bedroom) or on a mobile device related to a specific user (e.g., a smartphone, a watch, a wearable fitness-related device, a key fob). When a user detects that the product needs to be replaced or reordered (either before or after the product is entirely gone) the user can activate the electronic application, which in turn will transmit the order to another apparatus to be processed (e.g., finalizing, processing, shipping) and/or may be processed by the device having the electronic application itself. In some embodiments, the designated electronic button or electronic application may process an order without additional input, from a user and/or other input.

For example, activating the electronic application may select a default providing entity (e.g., Target), brand (name-brand vs. store brand), quantity (based on one or more past orders and/or a user selection), shipping information (e.g., cost, shipping entity, time to shipping, time to delivery, delivery requirements such as signature, packaging, some combination, other information, etc.), some combination, and/or other information and/or data. Such defaults may be user related, system related, product related, and/or providing entity related, among other things For example, a user may request, select, designate, and/or otherwise choose to always order diapers from one retailer but order paper towels from another retailer. As another example, a user may request, select, designate, and/or otherwise choose to always order one category of items (e.g., food items) from one retailer but another category of items (e.g., clothing, toiletries) from another retailer. In some embodiments, user related information may be based on a series of questions based on different options (providing specific retailers to choose from, most important factors such as price, shipping speed, quality, etc., some combination of these, and/or other information among others), past order history (relating to the same, related, and/or different products), some combination, and/or other information. In some embodiments, a system may have certain defaults based on pre-selected characteristics, operating parameters, etc. In some embodiments, one or more defaults may be selected based at least in part on the product and/or the providing entity. For example, a more perishable food product may have a designated shipping methods of a projected 2-day-shipping, where clothing or other products may have a designated characteristic of 5-day-shipping. Or, in some embodiments, an entity may use next day shipping for certain customers and/or products at the entity's election.

In some embodiments, order module 215 may perform different operations based on one or more inputs relating to a designated electronic button, among other things In some embodiments, order module 215 may perform different operations based on certain input types and/or the input itself. For example, order module 215 may automatically initiate an immediate order based on different types of user input, including but not limited to varying tactile input (e.g., single tapping, tap and hold, multiple taps on a touch screen), varying audible and/or written input (e.g., including identifying key words, items that may by default be more or less important, items that may be needed by a certain date, etc.), some combination, and/or other information and/or data.

In some embodiments, at least some, if not all, of the defaults, characteristics and other parameters relating to one or more orders may be modified and/or adjusted based on order circumstances, user preferences, user need, product characteristics, etc.

In some embodiments, the order module 215-*a* (including but not limited to identification module 310) may act as, use, and/or be a video recorder, a digital camera, a scanner, a scale, and/or as a timer. The order module 215-*a* and/or an associated device may be located in and/or related to a structure (e.g., a home, a business). The order module 215-*a* may be programmed to detect and monitor the use of a product using one or more algorithms The camera may be capable of identifying a product and/or a user using image recognition technology, bar code recognition, weight recognition technology (based on a projected, calculated, and/or actual weight of a product to determine usage characteristics and other product order information), facial recognition technology, elapsed time (based at least in part on product purchase date, expiration date, product usage, elapsed time since a prior order, elapsed time between multiple prior orders), some combination, and/or other characteristics.

In some embodiments, the order module 215-*a* may detect one or more characteristics relating to a product (alone or in combination with one or more other automation system components, such as sensors). Such characteristics may include frequency of use, identifying user's use, calculating expected product life, correlating product characteristics with use, projecting a day of product expiration and/or total use, product reordering related to one or more parameters, past ordering of the same products, past ordering relating to companion and/or linked products, past orders from a similar providing entity, past ordering information of products ordered at the same time, some combination, and/or other information.

For example, a user may set a reoccurring order on a daily, weekly, monthly, and/or a yearly basis (and/or another basis that may or may not be time-based) using the input module 305, or some other module of order module 215-*a* and/or another component. Alternatively and/or additionally, in some embodiments, one or more components may perform product ordering automatically based on data relating to past product ordering, user behavior, one or more inputs, audible and/or written cues from a user to the system and/or to another user, audible and/or written requests to the system and/or to another user, based on the user's response or lack thereof due to a notification and/or other communication, occupancy data, behavioral patterns, one or more user preferences and/or profile settings, some combination, and/or other information and/or data. The determination module 315, or some other module of order module 215-*a* and/or another component, can process the information received from the input module 305 and determine when to reorder a product and may use the generation module 320 to generate a new product order (or alternatively and/or additionally may receive a new product order from a separate device itself, such as a remote server 145).

In some embodiments, upon receiving a confirmation from a user, the generation module 320 may act as an ordering unit. The generation module 320 may order a product for the user and generates one or more notification for the user and/or a delivery person. Once an order has been generated, in some embodiments, the tracker module 325 may create a multi-media message for the user, such as an email, a text message, a push notification, an audible recording, a message displayed on a control panel, some combination, and/or other information and/or data. The message may include estimated day and time of product delivery, location of product in route to users home, delay of product delivery, some combination, and/or other information and/or data.

Figure 4:
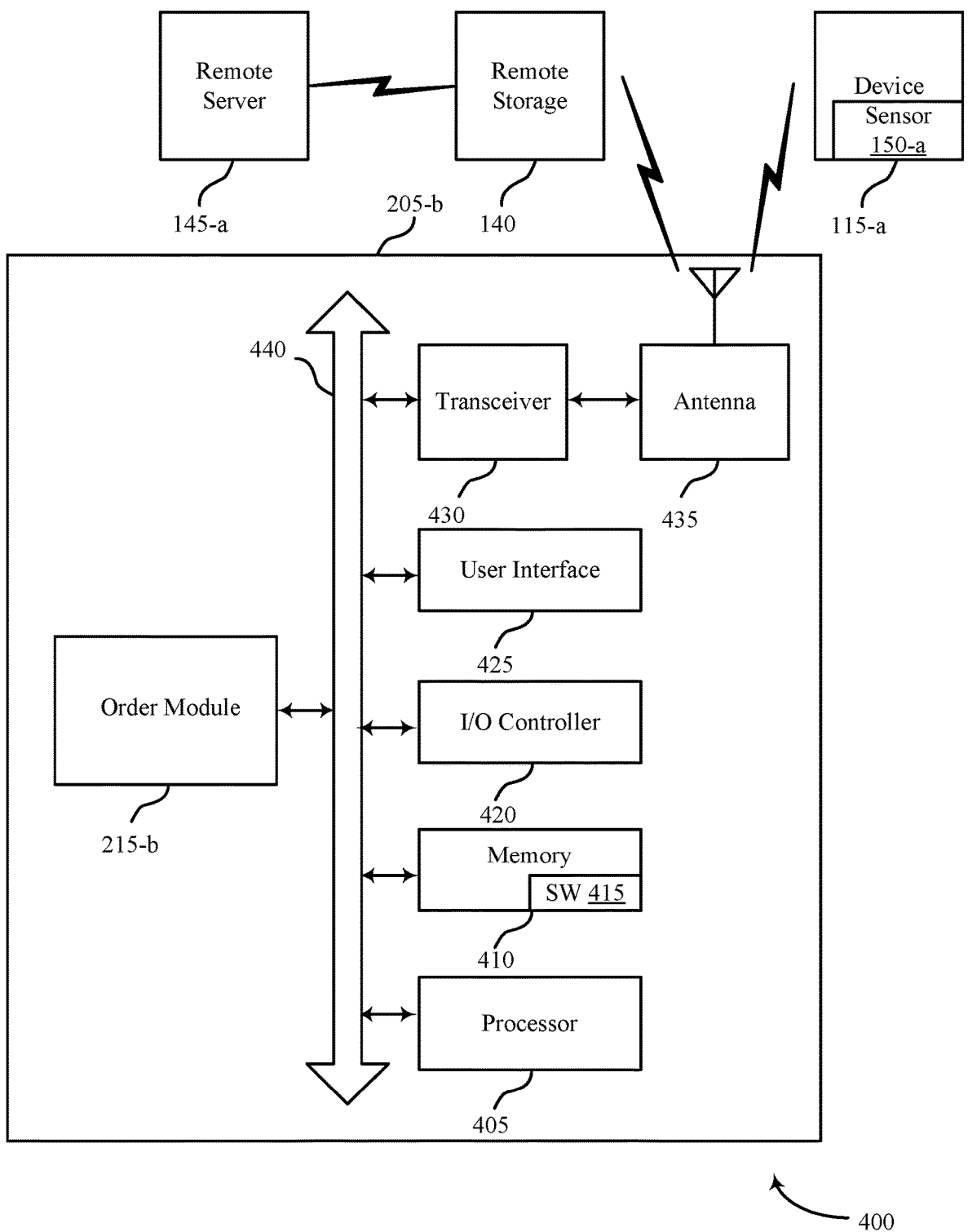
FIG. 4 shows a block diagram relating to a security and/or an automation system, in accordance with various aspects of this disclosure.

FIG. 4 shows a system 400 for use in product ordering and/or reordering systems, in accordance with various examples. System 400 may include an apparatus 205-b, which may be an example of the apparatuses 105 of FIG. 1, among others. Apparatus 205-b may also be an example of one or more aspects of apparatuses 205 and/or 205-a of FIGS. 2 and 3, among others.

Apparatus 205-b may include order module 215-b, which may be an example of order module 215 described with reference to FIGS. 2 and 3, among others. In some embodiments, the terms an apparatus, a control panel, and/or a control device are used synonymously, unless otherwise specifically noted.

Apparatus 205-b may also include components for bi-directional voice and data communications including components for transmitting communications and components for receiving communications. For example, apparatus 205-b may communicate bi-directionally with one or more of device 115-a, one or more sensors 150-a, remote storage 140, and/or remote server 145-a, which may be an example of the remote server of FIG. 1. This bi-directional communication may be direct (e.g., apparatus 205-b communicating directly with remote storage 140) or indirect (e.g., apparatus 205-b communicating indirectly with remote server 145-a through remote storage 140).

The order module 215-b may perform one or more operations relating to data and/or information for product ordering and/or reordering that, in at least some embodiments, relates to home automation system components, functions, and/or capabilities. Product ordering and/or reordering may be based at least in part on one or more inputs, identifications, determinations, generations, tracking functions, initiations, operations, and/or other automatic and/or automated functions, some combination, and/or others as described above with reference to FIGS. 1-3 or as evident from this disclosure. For example, order module 215-b may receive one or more inputs; may perform one or more operations, functions, and/or algorithms relating to at least one of the one or more inputs; may identify one or more product order parameters including, but not limited to, default entities and/or products, default conditions, default user preferences, selected entities and/or products, selected conditions, selected user preferences, and/or some combination of these, among others; may receive information relating to a product order including, but not limited to, generating and/or identifying a new order, identifying and/or analyzing an existing pending order, identifying and/or analyzing a past order in a history, and/or some combination of these, among others; may determine one or more pieces of data and/or information relating to a product order, including, but not limited to, delivery information and/or data, shipping information and/or data, identifying information and/or data, and/or other information and/or data, and/or some combination of these, among others; and/or may initiate an automation system operation based at least in part on other operations, functions, algorithm steps, information, data, and/or some combination of these, among others, including but not limited to delivery information and/or data.

Apparatus 205-b may also include a processor module 405, and memory 410 (including software/firmware code (SW) 415), an input/output (I/O) controller module 420, a user interface module 425, a transceiver module 430, and one or more antennas 435 each of which may communicate—directly or indirectly—with one another (e.g., via one or more buses 440). The transceiver module 430 may communicate bi-directionally—via the one or more antennas 435, wired links, and/or wireless links—with one or more networks or remote devices as described above. For example, the transceiver module 430 may communicate bi-directionally with one or more of device 115-a, remote storage 140, and/or remote server 145-a. The transceiver module 430 may include a modem to modulate the packets and provide the modulated packets to the one or more antennas 435 for transmission, and to demodulate packets received from the one or more antenna 435. While an apparatus or a control device (e.g., 205-b) may include a single antenna 435, the apparatus or the control device may also have multiple antennas 435 capable of concurrently transmitting or receiving multiple wired and/or wireless transmissions. In some embodiments, one element of apparatus 205-b (e.g., one or more antennas 435, transceiver module 430, etc.) may provide a direct connection to a remote server 145-a via a direct network link to the Internet via a point of presence (POP). In some embodiments, one element of apparatus 205-b (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 435 and/or transceiver module 430 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 435 may receive signals or information specific and/or exclusive to itself. In other embodiments, each antenna 435 may receive signals or information not specific or exclusive to itself.

In some embodiments, one or more sensors 150-a (e.g., motion, proximity, smoke, light, glass break, door, window, carbon monoxide, and/or another sensor) may connect to some element of system 400 via a network using one or more wired and/or wireless connections.

In some embodiments, the user interface module 425 may include an audio device, such as an external speaker system, an external display device such as a display screen, and/or an input device (e.g., remote control device interfaced with the user interface module 425 directly and/or through I/O controller module 420).

One or more buses 440 may allow data communication between one or more elements of apparatus 205-b (e.g., processor module 405, memory 410, I/O controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., receiving and/or utilizing one or more inputs, identifying one or more order-related parameters, receiving and/or generating one or more product orders, determining information and/or data related to one or more product orders, users, and/or other information, determining data relating to a product order, and/or initiating an automation system operation based at least in part on other information and/or data, etc.). Alternatively or additionally, the software/firmware code 415 may not be directly executable by the processor module 405 but may cause a computer (e.g., when compiled and executed) to perform functions described herein. Alternatively or additionally, the computer-readable, computer-executable software/firmware code 415 may not be directly executable by the processor module 405 but may be configured to cause a computer (e.g., when compiled and executed) to perform functions described herein. The processor module 405 may include an intelligent hardware device, e.g., a central processing unit (CPU), a microcontroller, an application-specific integrated circuit (ASIC), etc.

In some embodiments, the memory 410 can contain, among other things, the Basic Input-Output system (BIOS) which may control basic hardware and/or software operation such as the interaction with peripheral components or devices. For example, the order module 215-b to implement the present systems and methods may be stored within the memory 410. Applications resident with system 400 are, for example, stored on and accessed via a non-transitory computer readable medium, such as a hard disk drive or other storage medium. Alternatively or additionally, applications can be in the form of electronic signals modulated in accordance with the application and data communication technology when accessed via a network interface (e.g., transceiver module 430, one or more antennas 435, etc.).

Many other devices and/or subsystems may be connected to one or may be included as one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of memory 410 or other memory. The operating system provided on I/O controller module 420 may be iOS®, ANDROID®, MS-DOS®, MS-WINDOWS®, OS/2®, UNIX®, LINUX®, or another known operating system.

The transceiver module 430 may include a modem configured to modulate the packets and provide the modulated packets to the antennas 435 for transmission and/or to demodulate packets received from the antennas 435. While the apparatus or control device (e.g., 205-b) may include a single antenna 435, the apparatus or control device (e.g., 205-b) may have multiple antennas 435 capable of concurrently transmitting and/or receiving multiple wireless transmissions.

Figure 5:
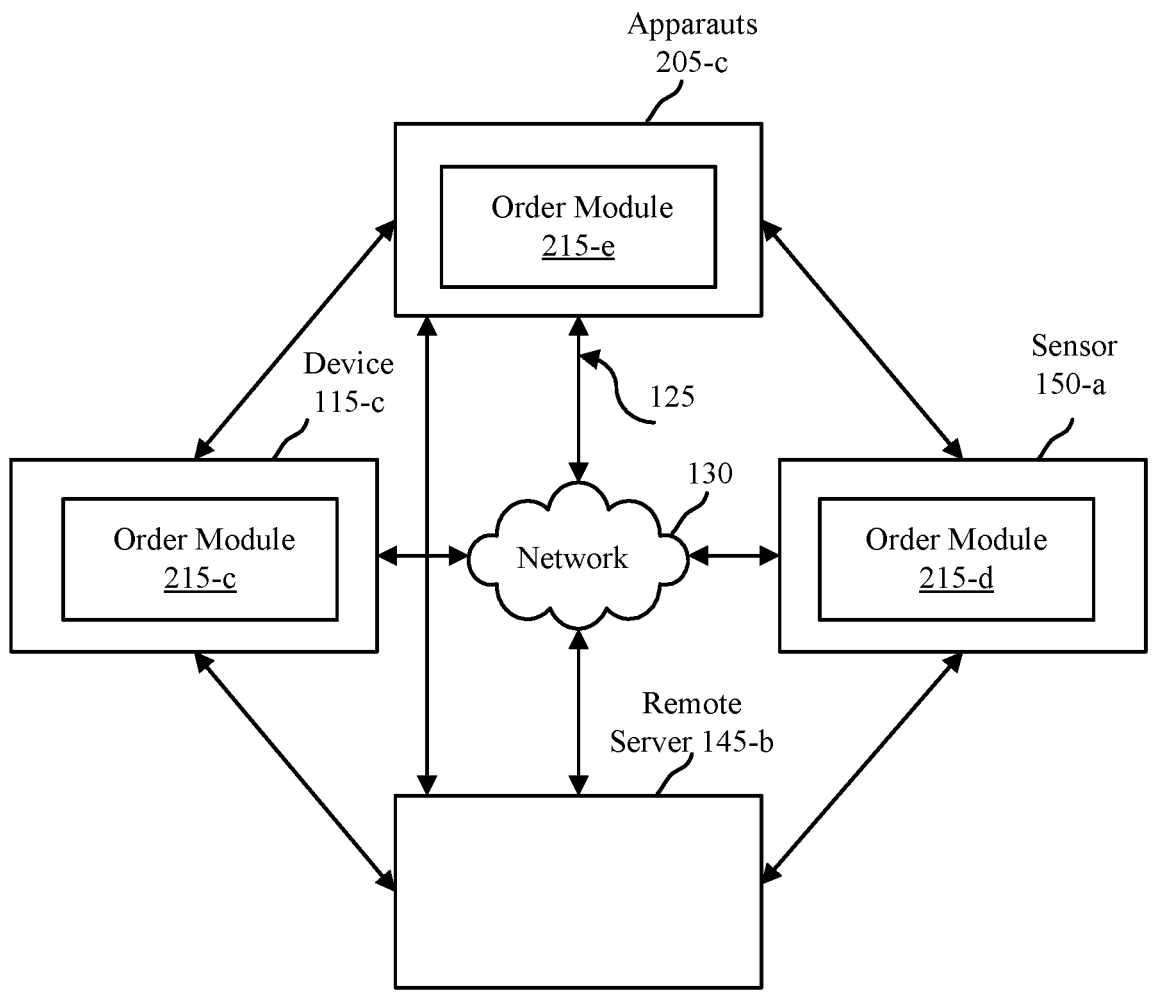
FIG. 5 shows a block diagram of an apparatus relating to a security and/or an automation system, in accordance with various aspects of this disclosure

FIG. 5 illustrates an example of a system 500 in accordance with various aspects of the disclosure. The system 500 may include apparatus 205-c, device 115-c, sensor 150-a, remote server 145-b, one or more devices within geographic coverage area 110-a, network 130, and/or other components. In some embodiments, at least some of these one or more components may communicate with each other using similar, different, exactly the same, and/or other variations of different signals.

In some embodiments, apparatus 205-c may communicate directly and/or indirectly with other devices via wired and/or wireless connections. Indirect communication may include communicating with one or more devices via network 130. Additionally and/or alternatively, indirect communication may include communicating with one device through another device. For example, apparatus 205-c may communicate with sensor 150-a through device 115-c. In some embodiments, this indirect communication may be facilitated by, performed by, routed through, and/or another operation relating to order module 215-c, 215-d, and/or 215-e, among other modules. In some embodiments, each apparatus 205 may be able to and/or configured to communicate with one or more other devices.

In some embodiments, apparatus 205, sensors 150, devices 115, and/or other components may communicate with other similar and/or other different components that may be separated by a distance. Then, in some embodiments, after a certain parameter, threshold, limit, and/or other constraint is met (e.g., the number of components communicating, a calculated distance from an origin components to another component, etc.), that powered faceplate device may communicate with a certain component with certain capabilities, such as storage, analysis, identifying, determination, data capture, operation initiation, etc. In some embodiments, an apparatus 205 may not require all and/or any of the elements of an order module 215 to function and/or may function based on one or elements of data and/or information, including different modules. As another example, apparatus 205-c may communicate with remote server 145-b through one or more devices within geographic coverage area 110-a.

In some embodiments, one or more apparatuses 205-c may receive, capture, store, and/or otherwise control input data, among other things This input data, in some embodiments, may be transmitted to a remote server 145-b directly and/or indirectly to have one or more operations and/or functions performed. Following performance of these operations and/or functions (including, but not limited to those discussed for all of modules 305-330), the remote server 145-b may transmit information (including but not limited to instructions, product order-related information, initiation signals, operation requests, some combination, and/or other information) to the same apparatus 205-c and/or to another apparatus 205-c. In some embodiments, remote server 145-b may include an order module 215 and may perform one, some, and/or all of the functions and/or operations of the modules of order module 215.

In some embodiments, one or more sensors 150 may receive, capture, and/or otherwise possess input data among other things This input data, in some embodiments, may be transmitted to a remote server 145-b directly and/or indirectly to have one or more operations and/or functions performed. Following performance of these operations and/ or functions (including, but not limited to those discussed for all of modules 305-330), the remote server 145-*b* may transmit information (including but not limited to instructions, product order-related information, initiation signals, operation requests, some combination, and/or other information) to the same one or more sensors 150, one or more other sensors 150, another apparatus 205-*c*, some combination, and/or other components and/or elements.

In some embodiments, network 130 may comprise a wireless network only. In some embodiments, network 130 may comprise a wired network only. In some embodiments, network 130 may comprise a wireless and a wired network, where some components use at least a wired connection and some components use at least a wireless connection. In some embodiments, network 130 may comprise a wireless and a wired network, where some components use only a wired connection and some components use only a wireless connection.

Figure 6:
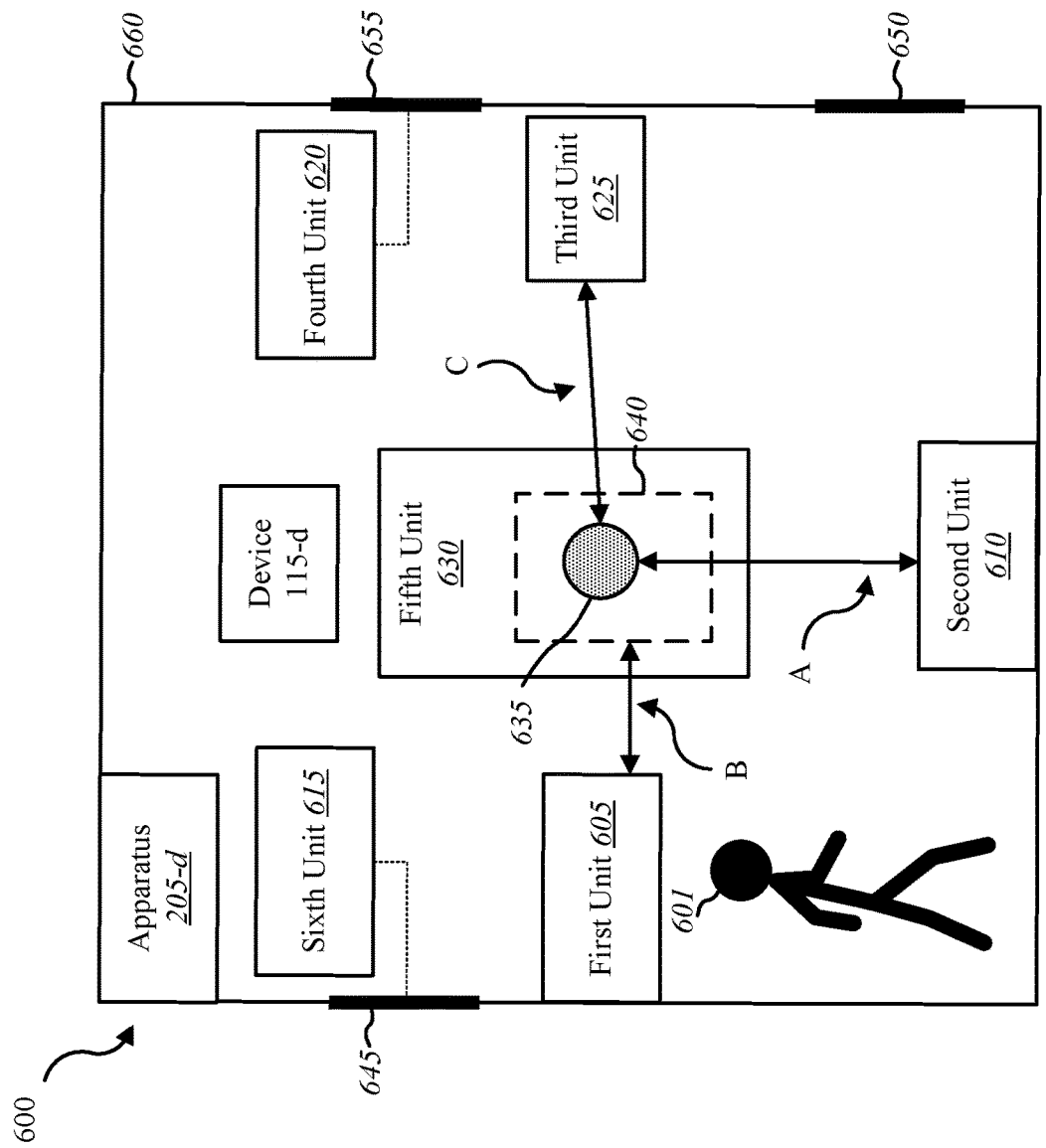
FIG. 6 shows a diagram of an apparatus relating to a security and/or an automation system, in accordance with various aspects of this disclosure.

FIG. 6 illustrates an example of a system 600 in accordance with various aspects of the disclosure. The system 600 may include apparatus 205-*d*, device 115-*d*, units 605-630, sensors 150, remote server 145-*b*, one or more devices within geographic coverage area 110-*a*, network 130, and/or other components. In some embodiments, at least some of these one or more components may communicate with each other using similar, different, exactly the same, and/or other variations of different signals.

In some embodiments, structure 660 may include one or more entrance points (e.g., 645, 650, 655) that have one or more characteristics. These entrance points may incorporate one or more sensors 150, may include one or more covering that can be actuated (e.g., a door, an opening that can be opened by a user and/or by a mechanical means including but not limited to by components of an automation system and/or another structure features), a securing fastener (e.g., a lock), a sensor, one or more other automation system components, some combination, and/or other characteristics. In some embodiments, each of units 605-630 may include one or more sensors, devices, components, apparatuses, and/or other devices. In some embodiments, each of units 605-630 may include one or more sensors that may measure, detect, process, capture, analyze, measure, calculate, determine, activate, identify, and/or track one or more elements of information and/or data. In some embodiments, each of units 605-630 may include the same capabilities (e.g., may be able to capture image and/or video data). In other embodiments, at least some of units 605-630 may include different capabilities. For example, fifth unit 630 may include measuring weight of an object 635 in area 640 based on one or more weight sensors, while second unit 610 may include capturing image data based at least in part on a location of object 635 in an area 640 relating to a first distance (A) and first unit may include scanning a barcode based on a location of object 635 in an area 640 relating to a second distance (B).

In some embodiments, one or more operations relating to order module 215-*d* may include performing one or more operations relating to different input and/or data relating to object 635 with other data and/or information. This other data and/or information may be stored on and/or relate to a remote server, a local storage device, the Internet including a world wide web page, a user's personal photos, social media photos and/or profile information, some combination, and/or other information. In some embodiments, at least one component of a system (e.g., communications system 100, system 600) may receive input relating to one or more objects 635, and at least one component (the same and/or different) may compare, correlate, analyze, associate link, measure, evaluate, balance, assess, determine, identify, and/or otherwise relate the input relating to one or more objects with other inputs, data, and/or information. In some embodiments, these operations may be based at least in part on color, shape, texture, identifying information, numerical information, bar code information, patterns, material, some combination, and/or other information.

In some embodiments, area 640 may be designated to relate to products that require a reorder (based on being entirely used, mostly used, half used, a qualitative use determination, a quantitative use determination, 50% used, 75% used, 100% used, having, only a limited supply left, a limited time period before expiration, a limited time period before spoiling, any combination, etc.). A user may place a product container, packaging, and/or product itself in an area 640, and one or more components of a system (such as an apparatus 205-*d*) may perform and/or otherwise facilitate a product reorder. In some embodiments, this reordering may be based at least in part on performing one or more operations, including but not limited to comparing, correlating, analyzing, associating, linking, measuring, evaluating, balancing, assessing, determining, identifying, and/or otherwise relating the input relating to one or more objects with other inputs, data, and/or information stored on and/or relating to a remote server, a local storage device, the Internet including a world wide web page, a user's personal photos, social media photos and/or profile information, some combination, and/or other information.

In some embodiments, area 640 may be determined based on one or more system components and/or capabilities, including, but not limited to, system component location, sensors, distance, height, position, relation to other system components, unit characteristics, spatial relationship to one or more entrance points, spatial relationship to one or more appliance and/or other electronic devices, spatial relationship to one or more rooms and/or room sectors, spatial relationship to one or more user's 601 position, some combination, and/or other information and/or data. In some embodiments, area 640 may be selected by a user based on a user preference, a more or a less accessible area, a central location, location relating to one or more sensors including specific types of sensors, occupancy trends and/or patterns, some combination, and/or other information and/or data.

Figure 7:
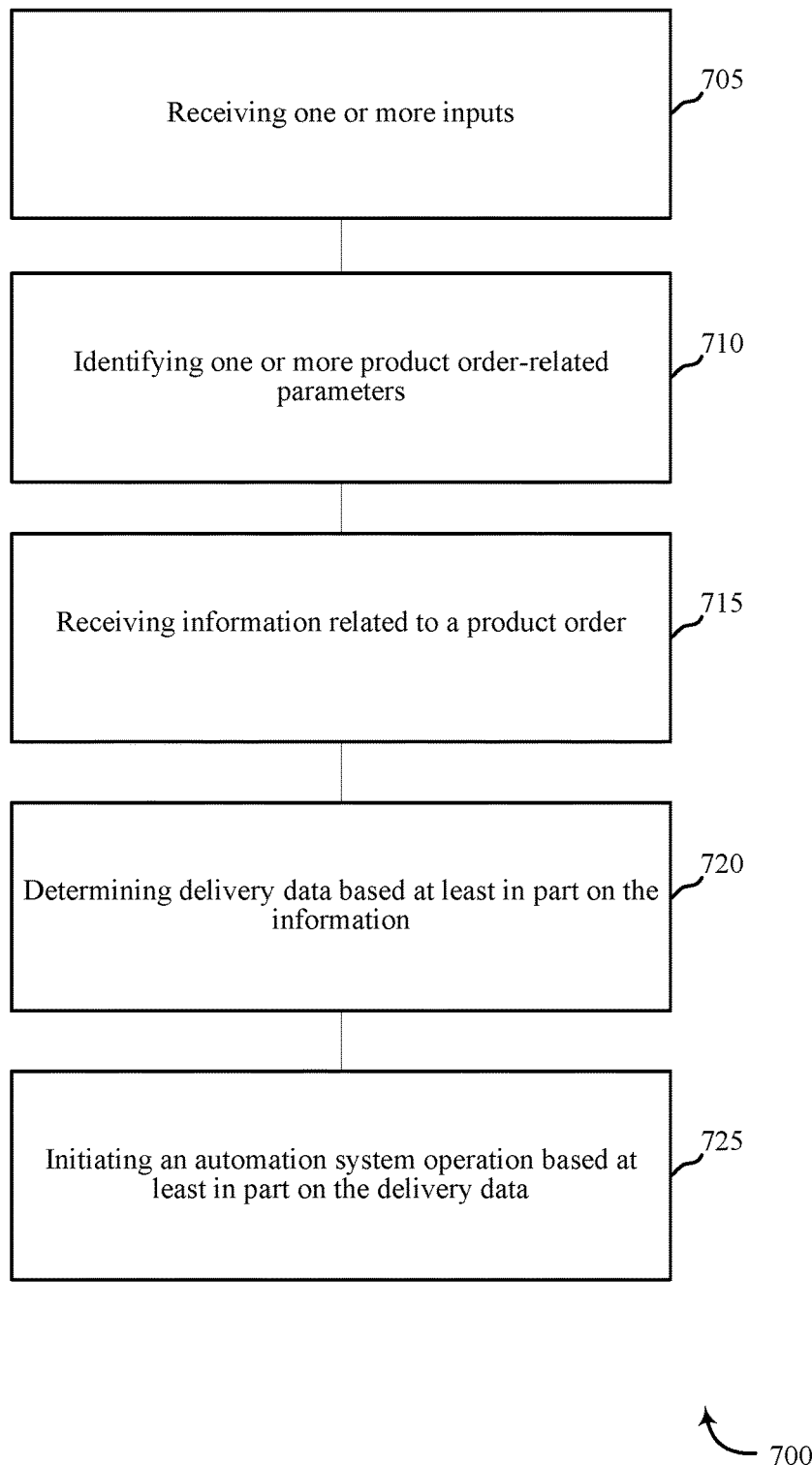
FIG. 7 is a flow chart illustrating an example of a method relating to a security and/or an automation system, in accordance with various aspects of this disclosure.

FIG. 7 is a flow chart illustrating examples of a method 700 for product ordering relating to a home automation system, in accordance with various aspects of the present disclosure. For clarity, the method 700 is described below with reference to aspects of one or more of the apparatuses 105, described with reference to FIG. 1 and others, apparatuses 205 and/or 205-*a* described with references to FIGS. 2 and 3, among others, and/or aspects of one or more of the order modules described with reference to FIGS. 2-4, among others. In some examples, an apparatus may execute one or more sets of codes to control the functional elements of one or more of the same and/or different apparatuses (including, but not limited to one or more automation system components) to perform some and/or all of the functions described below. Additionally or alternatively, the apparatus 205 and/or 205-*a* may perform one or more of the functions described below using special-purpose hardware.

At block 705, the method 700 may include receiving one or more inputs. At block 710, the method 700 may include identifying one or more product order-related parameters. At block 715, the method 700 may include receiving information related to a product order. At block 720, the method 700 may include determining delivery data based at least in part on the information. At block 725, the method 700 may include initiating an automation system operation based at least in part on the delivery data. In some embodiments, each and/or some of these operations may be the same as, similar to, and/or different from that described with respect to other figures and/or other embodiments in this disclosure.

The operation(s) at blocks 705-725 may be performed using the order module 215 and/or 215-a and/or variations described with reference to FIGS. 1-6, among others.

Thus, the method 700 may provide for product ordering functions and operations relating to automation/security systems. It should be noted that the method 700 is just one implementation and that the operations of the method 700 may be rearranged or otherwise modified such that other implementations are possible.

Figure 8:
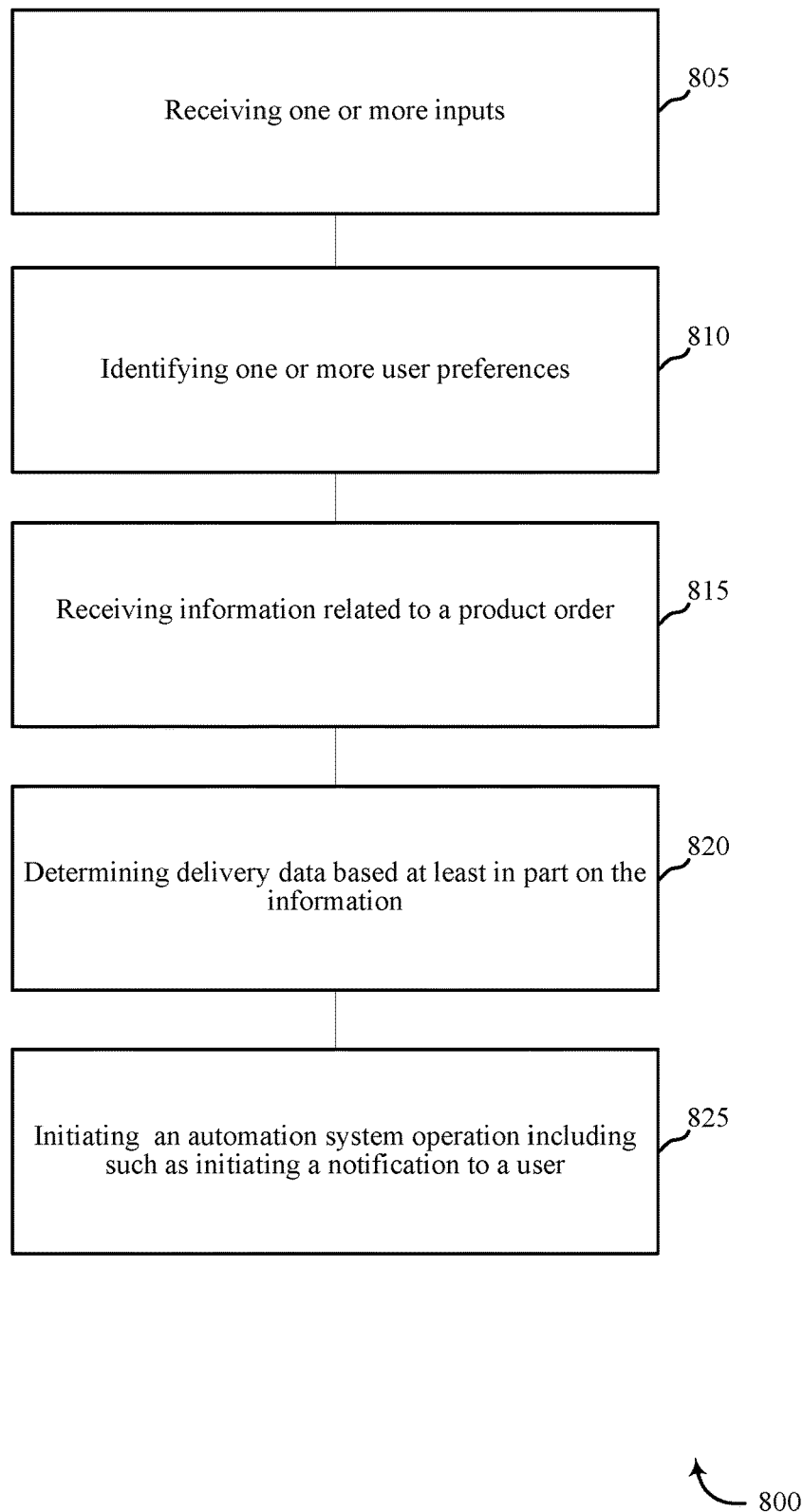
FIG. 8 is a flow chart illustrating an example of a method relating to a security and/or an automation system, in accordance with various aspects of this disclosure.

FIG. 8 is a flow chart illustrating examples of a method 800 for product ordering relating to a home automation system, in accordance with various aspects of the present disclosure. For clarity, the method 800 is described below with reference to aspects of one or more of the apparatuses 105, described with reference to FIG. 1 and others, apparatuses 205 and/or 205-a described with references to FIGS. 2 and 3, and others, and/or aspects of one or more of the order modules described with reference to FIGS. 2-4 and others. In some examples, an apparatus may execute one or more sets of codes to control the functional elements of one or more of the same and/or different apparatuses (including, but not limited to one or more automation system components) to perform some and/or all of the functions described below. Additionally or alternatively, the apparatus 205 and/or 205-a may perform one or more of the functions described below using special-purpose hardware.

At block 805, the method 800 may include receiving one or more inputs. At block 810, the method 800 may include identifying one or more user preferences. At block 815, the method 800 may include receiving information related to a product order. At block 820, the method 800 may include determining delivery data based at least in part on the information. At block 825, the method 700 may include initiating an automation system operation such as initiating a notification to a user. In some embodiments, each and/or some of these operations may be the same as, similar to, and/or different from that described with respect to other figures and/or other embodiments in this disclosure.

The operation(s) at blocks 805-825 may be performed using the order module 215 and/or 215-a and/or variations described with reference to FIGS. 1-6, among others.

Figure 9:
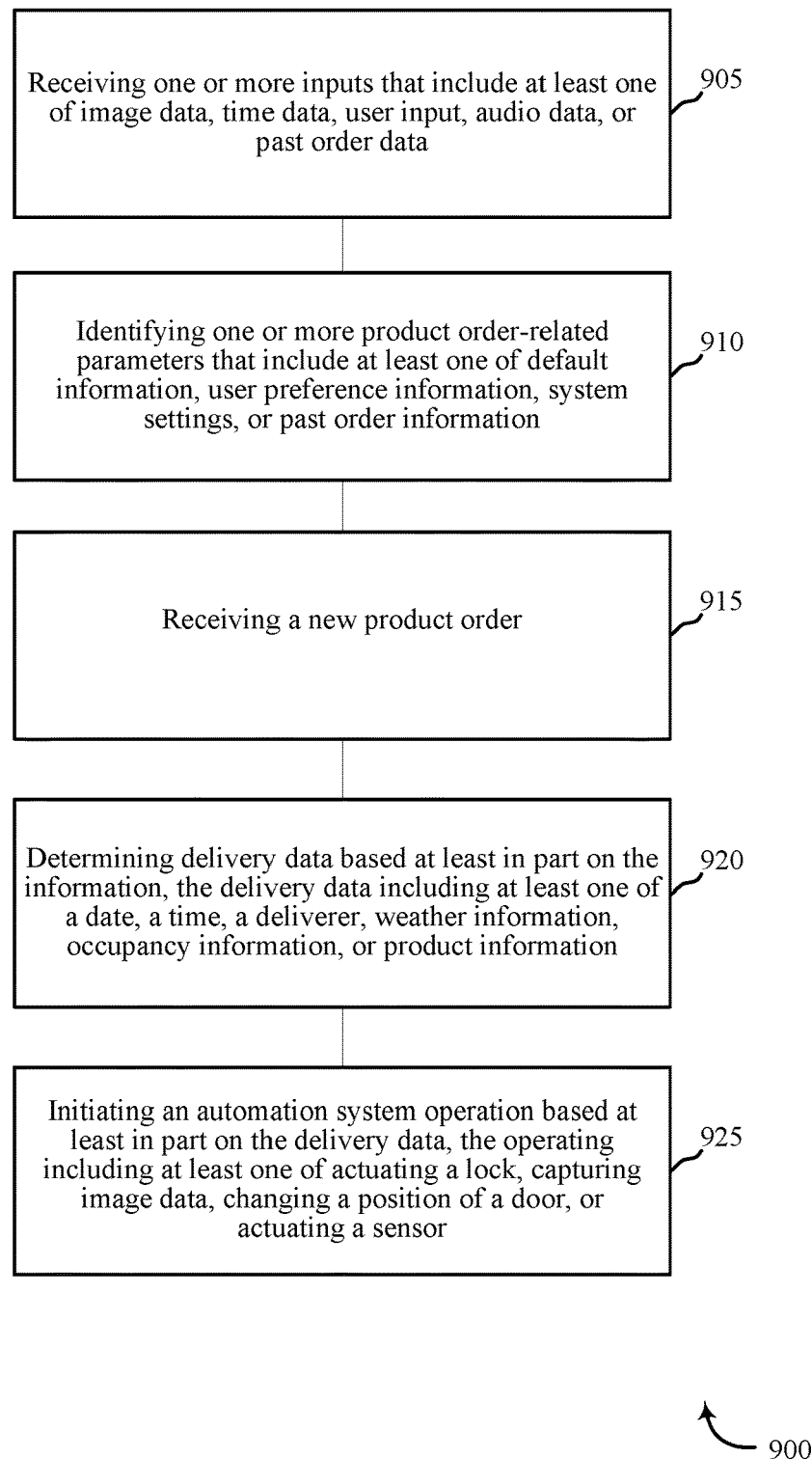
FIG. 9 is a flow chart illustrating an example of a method relating to a security and/or an automation system, in accordance with various aspects of this disclosure.

FIG. 9 is a flow chart illustrating examples of a method 900 for product ordering relating to a home automation system, in accordance with various aspects of the present disclosure. For clarity, the method 900 is described below with reference to aspects of one or more of the apparatuses 105, described with reference to FIG. 1 and others, apparatuses 205 and/or 205-a described with references to FIGS. 2 and 3, and others, and/or aspects of one or more of the order modules described with reference to FIGS. 2-4 and others. In some examples, an apparatus may execute one or more sets of codes to control the functional elements of one or more of the same and/or different apparatuses (including, but not limited to one or more automation system components) to perform some and/or all of the functions described below. Additionally or alternatively, the apparatus 205 and/or 205-a may perform one or more of the functions described below using special-purpose hardware.

At block 905, the method 900 may include receiving one or more inputs that include at least one of image data, time data, user input, audio data, or past order data. At block 910, the method 900 may include identifying one or more product order-related parameters that include at least one of default information, user preference information, system settings, or past order information. At block 915, the method 900 may include receiving a new product order. At block 920, the method 900 may include determining delivery data based at least in part on the information, the delivery data including at least one of a date, a time, a deliverer, weather information, a delay, a reason for a delay, occupancy information, or product information. At block 925, the method 900 may include initiating an automation system operation based at least in part on the delivery data, the operating including at least one of actuating a lock, capturing image data, changing a position of a door, or actuating a sensor. In some embodiments, each and/or some of these operations may be the same as, similar to, and/or different from that described with respect to other figures and/or other embodiments in this disclosure.

The operation(s) at blocks 905-925 may be performed using the order module 215 and/or 215-a and/or variations described with reference to FIGS. 1-6, among others.

In some examples, aspects from two or more of the methods 700-900 may be combined, omitted, and/or separated. It should be noted that the methods 700, 800, 900 are just example implementations, and that the operations of the methods 700-900 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for product ordering relating to an automation system in a home or a business, comprising:
   receiving, at a wall-mounted control panel of the automation system in the home or the business, image data captured on a date corresponding to an occuring event;
   identifying, based at least in part on the image data, a product depicted within the image data that is associated with the occuring event;
   receiving, at the control panel, an audible input comprising one or more keywords associated with creating a product order for delivering the product depicted within the image data to the home or the business;
   identifying a retailer for the product based at least in part on identifying the one or more keywords associated with creating the product order from the audible input;
   selecting, by the control panel, a brand for the product based at least in part on the identified retailer and a price of the product associated with the selected brand and at least one unselected brand;
   creating, by the control panel and based at least in part on receiving the audible input comprising the one or more keywords, the product order for delivering the identified retailer and selected brand of the product depicted within the image data to the home or the business by the date corresponding to the occurring event;

receiving information related to the product order based at least in part on the retailer for the product, the product order including instructions for the product to be delivered to an entrance of the home or the business;

determining delivery data related to the product order based at least in part on the information related to the product order and information related to a tracked location of the product; and initiating an automation system operation, by the control panel, to actuate a lock and open a door of the entrance of the home or the business based at least in part on the delivery data and the information related to the tracked location of the product.

2. The method of claim 1, further comprising:

initiating a notification to a user notifying the user of the created product order, the determined delivery data, or the automation system operation.

3. The method of claim 2, wherein the notification comprises:

at least one of a date, a day of a week, a time, a location, a product type, an estimated delivery date, or a combination thereof.

4. The method of claim 2, wherein the notification comprises: a reminder.

5. The method of claim 2, wherein the notification comprises: a confirmation.

6. The method of claim 1, wherein the audible input comprises: user input.

7. The method of claim 1, wherein the audible input comprises: one or more time periods.

8. The method of claim 1, wherein the audible input comprises: past order data.

9. The method of claim 1, wherein the information related to the product order comprises: a default product provider.

10. The method of claim 1, wherein the information related to the product order comprises: default shipping information.

11. The method of claim 1, wherein the delivery data is based at least in part on at least one of a date, a time, a deliverer, weather information, occupancy information, product information, or a combination thereof.

12. The method of claim 1. wherein the automation system operation comprises: capturing image data.

13. The method of claim 1, wherein the automation system operation. comprises: changing a position of a door.

14. The method of claim 1, wherein the tracked location of the product is based at least in part on global positioning system (GPS) data.

15. An apparatus for security and/or automation systems in a home or a business, comprising:

a processor;

memory in electronic communication with the processor; and instructions stored in the memory of a wall-mounted control panel of the security and/or automation system in the home or the business, the instructions being executable by the processor to:

receive, at the control panel of the automation system in the home or the business, image data captured on a date corresponding to an occuring event;

identify, based at least in part on the image data, a product depicted within the image data that is associated with the occuring event;

receive, at the control panel, an audible input comprising one or more keywords associated with creating a product order for delivering the product depicted within the image data to the home or the business;

identify a retailer for the product based at least in part on identifying the one or more keywords associated with creating the product order from the audible input;

select, by the control panel, a brand for the product based at least in part on the identified retailer and a price of the product associated with the selected brand and at least one unselected brand;

create, by the control panel and based at least in part on receiving the audible input comprising one or more keywords, the product order for delivering the identified retailer and selected brand of the product depicted within the image data to the home or the business by the date corresponding to the occurring event;

receive information related to the product order based at least in part on the retailer for the product, the product order including instructions for the product to be delivered to an entrance of the home or the business;

determine delivery data related to the product order based at least in part on the information related to the product order and information related to a tracked location of the product; and initiate an automation system operation, by the control panel, to actuate a lock and open a door of the entrance of the home or the business based at least in part on the delivery data and the information related to the tracked location of the product.

16. The apparatus of claim 15, the instructions further executable by the processor to:

initiate a notification to a user notifying the user of the created product order, the determined delivery data, or the automation system operation.

17. A non-transitory computer readable medium storing computer-executable code, the code executable by a processor in a home or a business to:

receive, at a wall-mounted control panel of an automation system in the home or the business, image data captured on a date corresponding to an occuring event;

identify, based at least in part on the image data, a product depicted within the image data that is associated with the occuring event;

receive, the control panel, an audible input comprising one or more keywords associated with creating a product order for delivering the product depicted within the image data to the home or the business;

identify a retailer for the product based at least in part on identifying the one or more keywords associated with creating the product order from the audible input;

select, by the control panel, a brand for the product based at least in part on the identified retailer and a price of the product associated with the selected brand and at least one unselected brand;

create, by the control panel and based at least in part on receiving the audible input comprising the one or more keywords, the product order for delivering the identified retailer and selected brand of the product depicted within the image data to the home or the business by the date corresponding to the occurring event;

receive information related to the product order based at least in part on the retailer for the product, the product order including instructions for the product to be delivered to an entrance of the home or the business;

determine delivery data related to the product order based at least in part on the information related to the product order and information related to a tracked location of the product; and initiate an automation system operation, by the control panel, to actuate a lock and open a door of the entrance of the home or the business based at least in part on the delivery data and the information related to the tracked location of the product.

18. The non-transitory computer readable medium of claim 17, wherein the code for receiving information related to the product order is further executable by the processor to:

automatically generate one or more product orders based at least in part on at least some of the one or more keywords associated with creating the product order.

* * * * *